12/13/83 XR 4,419,820

United States Patent [19]

Stumpf

[11] 4,419,820

[45] Dec. 13, 1983

[54] MATERIAL CUTTING MACHINE

[76] Inventor: Günter O. Stumpf, Ostendstrasse 13, 7432 Urach 1, Fed. Rep. of Germany

[21] Appl. No.: 354,777

[22] Filed: Mar. 4, 1982

[30] Foreign Application Priority Data

Mar. 19, 1981 [DE] Fed. Rep. of Germany ... 8108075[U]

[51] Int. Cl.3 .............................................. B23K 15/00

[52] U.S. Cl. ........................................ 30/124; 83/521; 219/121 LG

[58] Field of Search .................. 30/124, 296 R, 164.9; 83/400, 520, 521, 522; 219/121 LG, 121 LN

[56] References Cited

U.S. PATENT DOCUMENTS

| | | | |
|---|---|---|---|
| 3,026,617 | 3/1962 | Jendrisak | 30/164.9 X |
| 3,845,676 | 11/1974 | Pierce | 83/522 |
| 3,931,491 | 1/1976 | Stumpf | 219/121 LG |
| 4,275,633 | 6/1981 | Littlehorn | 83/520 |

*Primary Examiner*—Jimmy C. Peters

*Attorney, Agent, or Firm*—Scully, Scott, Murphy & Presser

[57] ABSTRACT

A movable guide system for material or cloth cutting out machines which can be easily manipulated and thereby facilitate the rapid filling of orders. The movable guide system employs the rotary arm machine principle, in which a frame extends over a laying table in a portal-like manner, wherein a carriage is rotatably fastened to the frame generally centrally above the laying table, wherein the carriage is retained at its pivot point displaceable relative to the frame and in which the cutting out element is fastened to one end of the carriage. The cloth cutting element is in each position thereof displaceable and rotatable with respect to the laying table, so that each point of the work area can be reached from every other point on the work area and whereby the motion of the cutting out element can also be easily carried out manually.

8 Claims, 4 Drawing Figures

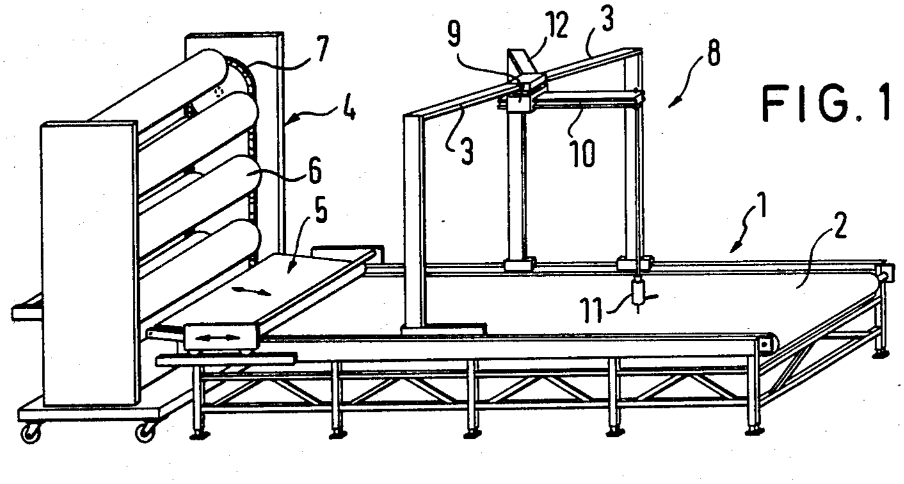
FIG. 1
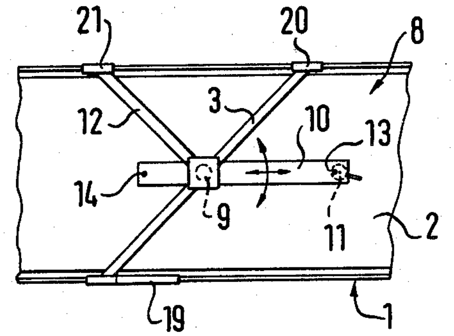
FIG. 2
FIG. 3
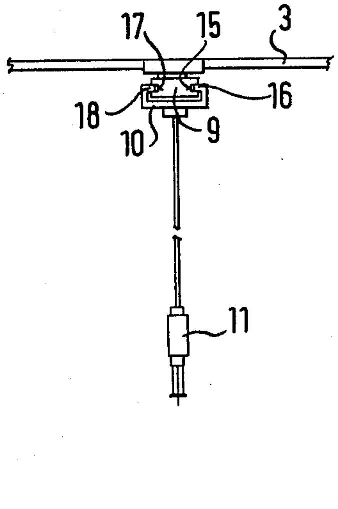
FIG. 4
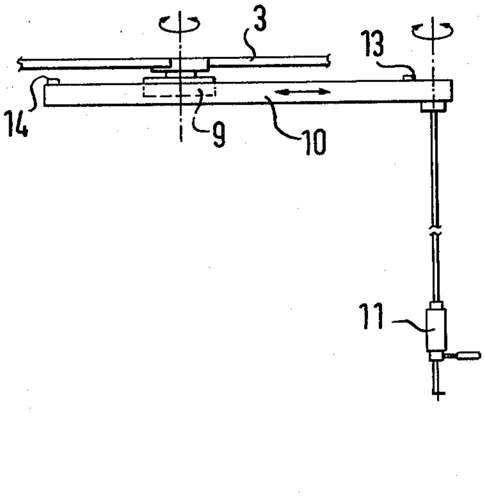

MATERIAL CUTTING MACHINE

BACKGROUND OF THE INVENTION

1. Field of the Invention

The present invention relates to a cutting out machine for material or cloth, including a frame associated with a laying table, and on which frame the cutting out element is fastened so as to, on the one hand, be linearly movable as well as, on the other hand, being also rotatable in a horizontal plane.

2. Discussion of the Prior Art

In cutting out machines for the cutting out of single or multi-layered webs which have been deposited on a laying table, a cutting out element such as a pinion-type cutting machine, a laser beam cutting element or the like must be able to traverse suitable curves, radii and acute angles. In essence, the cutting out element must be able to reach each point of the surface of the deposited web which is to be worked on, and must be able to include every suitable direction of movement. For this purpose there are employed the usual movable guide systems for the cutting out element. Utilized hereby are the cross-carriage machines in which there is produced a motion from two always mutually perpendicular translational movements; rotary arm machines in which the motion consists of a longitudinal displacement and a rotation; and hinged arm machines in which the motion is produced through two rotational movements. The cross-carriage machine is of particular advantage when there are to be essentially effectuated rectangular plan images and hereby, in particular linear cuts. The rotary arm machine is particularly adapted for circular cuts. However, the working area is determined by the length of the rotary arm, which is limited due to consideration given to the moment to be taken up at the point of rotation, and also because of spatial reasons. The rotary arm machine is thus limited primarily to smaller pattern plans. The hinged arm machine is especially suited for curved cuts; however, due to the variable angular positioning of the arms relative to each other, the movements of the parts are no longer at right angles so that, depending upon circumstances, it is no longer possible to effect a movement perpendicular thereto. In essence, a suitable direction of movement is not always afforded, (for instance, refer to DOB+haka-praxis, Edition 6/1974).

The known guide systems are primarily utilized for automatically controlled cloth cutting machines. However, frequently an instance will be encountered in which a single-layered or mutli-layered arrangement is to be cut out pursuant to only a singly occurant pattern plan, such as, for example, for infrequently occuring labeled sizes or for label sizes with smaller quantity, socalled boutique goods. The setting of the automatic system is hereby cumbersome and expensive. Because of this reason, in such instances utilization is made of the socalled handcut, in which the cloth cutting element is guided by hand through the single or multi-layered arrangement on the laying table.

Currently, for guide systems in which the handcut is utilized, there is usually employed the above-described hinged arm machine in which, as mentioned, a suitable direction of movement cannot always be afforded. Especially when the two linkage arms, at whose extreme there is fastened the cutting element, are in their extended stretched position, any movement out of this stretched position, for example, a folding about the middle hinge point is barely possible, in view of which the hinged arm machine is difficult to manipulate.

SUMMARY OF THE INVENTION

Accordingly, it is an object of the present invention to provide a movable guide system for material or cloth cutting out machines which, while avoiding the above-mentioned drawbacks, can be easily manipulated and thereby facilitates the rapid filling of orders.

The foregoing invention proceeds from the concept that optimum conditions for reaching these objects through a rotary arm machine can be achieved, when its own inherent advantages can be overcome.

The foregoing object is achieved through a movable guide system of the above-mentioned type employing the rotary arm machine principle, in which a frame extends over the laying table in a portal-like manner, wherein a carriage is rotatably fastened to the frame generally centrally above the laying table, wherein the carriage is retained at its pivot point displaceable relative to the frame and in which the cutting out element is fastened to one end of the carriage.

In the inventively constructed guide system, the cloth cutting element is in each position thereof displaceable and rotatable with respect to the laying table, so that each point of the work area can be reached from each other point on the work area and whereby the motion of the cutting out element can also be easily carried out manually.

BRIEF DESCRIPTION OF THE DRAWINGS

Reference may now be had to the following detailed description of an exemplary embodiment of the invention, taken in conjunction with the accompanying drawings; in which:

FIG. 1 schematically illustrates in a perspective view the arrangement of the movable guide system for the cutting out machine for a cloth cutting arrangement;

FIG. 2 is a fragmentary plan view of the cutting machine pursuant to FIG. 1;

FIG. 3 is a fragmentary front elevational view of the cutting machine of FIG. 1; and FIG. 4 is a fragmentary side elevational view of the cutting machine pursuant to FIG. 1.

DETAILED DESCRIPTION

The cloth pattern cutting system illustrated in FIG. 1 includes a stationary laying or depositing table 1 with a movable conveyor belt 2 extending thereon, on which there are deposited webs of material or cloth in single or multiple layers. These webs of material are drawn off from material rolls 6 in a storage rack 4 which can be stationary or rotatable as illustrated herein, and deposited be means a layering machine 5 onto the conveyor belt 2 of the laying table 1. The material rolls 6 are suspended in the storage rack 4 on movable chains 7 and exchangeably fastened thereto. Arranged above the laying table 1, associated with the layed out material web or the conveyor belt 2, is a cloth cutting machine 8, which includes a movable guide system as described in detail hereinbelow, and which a cloth cutting element, as well as a pinion-type cutting out machine for hand cutting, is fastened in such a manner that the cutting direction can act in a known manner upon the layers on the conveyor belt 2 for effecting the separation thereof.

The movable guide system for the cloth cutting machine 8 inlcudes an essentially $\pi$-shaped frame 3 extending portal-like over the laying table 1 or over the conveyor belt 2 of the laying table 1; in the middle of which above the laying table 1 there is arranged a rotatable element 9. Fastened to a rotatable element 9 is a carriage 10 which is essentially horizontally displaceable, and at whose one end there is fastened the cloth cutting element 11 so as to be rotatable about its own cutting axis (refer to FIG. 4).

The frame 3, which in the illustrated embodiment, extends at an angle with respect to the longitudinal extension of the laying table 1, is supported by means of a further arm 12 with respect to the laying table 1, wherein the further arm 12 originates at the rotatable element 9. The frame 3 can be moved in the illustrated embodiment by means of guide arrangements 19, 20 and 21 along the laying table 1 in such a manner that also extremely lengthy layers can be worked on through the intermediary of a single cloth cutting machine 8.

The guidance of the displaceable carriage 10 within the rotatable element 9 is effected in the illustrated embodiment in a manner wherein the carriage 10 possesses a C-shaped cross-section, in which the free ends 16, 18 engage in complementary grooves 15 and, respectively 17, which are formed in the rotatable element 9. However, the relationship between the C-shaped cross-section and the grooves can also be reversed, in essence, also the rotatable element 9 can possess a C-shaped cross-section while the carriage 10 possesses an I-shaped cross-section, and the free end of the rotatable element engage into the thusly formed grooves. It is also adequate when the carriage 10 is rotatable with respect to the section of the frame 3 which forms the pivot point which, for instance, can also be attained when at the pivot point there is provided a rotational element which includes an encompassing groove into which there engage the free ends 16, 18 of the carriage 10 with the C-shaped cross-section. It is also important that, on the one hand, the carriage 10 be arranged so as to be displaceable with respect to the frame 3 and, on the other hand, be rotatable relative thereto. The pivot may be about 220 cm above the floor supporting the machine.

Suitably, end stops 13 and 14 are provided at both ends of the carriage 10 which come into contact against the rotatable element 9.

Within the maximum swinging range which is determined by the length of the carriage 10, each point of the herewith defined working area can be reached from every other point without difficulties, since an unsatisfactory stretched position will not be encountered and there is present neither a preferred nor an unsatisfactory cutting direction.

Accordingly, through the cloth cutting machine incorporating the inventive guide system, by means of the cutting out element there can be traversed every suitable curve sequence, every suitable radius, and also every suitable acute angle. The cutting out can thus be effected quite rapidly without any difficulties, and also without tiring the cloth cutter, which affords a more rapid fulfilling of orders even with manual cutting.

What is claimed is:

1. A cutting machine for single or multiple layer webs which are deposited on a laying table, said machine comprising:

(a) a frame, said frame mounted for linear movement along said laying table, said frame having at least two vertical arms and a horizontal upper arm joining said vertical arms;

(b) a rotatable element mounted on said horizontal arm for rotation about a vertical axis;

(c) a linear guide means mounted for reciprocal movement in said rotatable element, said guide means pivotable in a horizontal plane to all sides of said table;

(d) a cutting means for rotation at one end of said guide means, whereby said cutting means may be rotated, reciprocated along an axis defined by said guide means, pivoted in a horizontal plane, and linearly displaced to reach any point in a horizontal plane defined by said table.

2. A cutting machine as claimed in claim 1, said frame extending generally $\pi$-shaped above and spanning said laying table.

3. A cutting machine as claimed in claim 1, wherein said frame comprises a third vertical arm for support, said frame being generally Y-shaped in a horizontal plan view.

4. A cutting machine as claimed in claim 1 or 3 wherein said rotatable element is mounted on said frame at a height of about 220 cm above the floor.

5. A cutting machine as claimed in claim 1, comprising stops at both ends of said guide means for contacting said rotatable element and thereby limiting the range of reciprocation.

6. A cutting machine as claimed in claim 1 or 4 wherein said frame supports itself on the lying table by means of a third arm, said third arm extending from the rotational axis of said rotatable element in such a manner that the frame in a horizontal plane view is generally Y-shaped.

7. A cutting machine according to claims 1 or 2 wherein said guide means include longitudinal grooves in its side edges which engage respectively each side of the rotatable element.

8. A cutting machine according to claim 1 or 2, wherein the guide means is formed with a generally C-shaped cross section, whose free ends engage corresponding grooves formed in the rotatable element.

* * * * *

UNITED STATES PATENT AND TRADEMARK OFFICE
CERTIFICATE OF CORRECTION

PATENT NO. : 4,419,820

DATED : December 13, 1983

INVENTOR(S) : Gunter O. Stumpf

It is certified that error appears in the above—identified patent and that said Letters Patent is hereby corrected as shown below:

Column 4, line 20, "a cutting means for rotation" should read -- a cutting means mounted for rotation --.

Column 4, line 45, "plane" should read -- plan --.

Signed and Sealed this

*Seventeenth* Day of *April 1984*

[SEAL]

*Attest:*

GERALD J. MOSSINGHOFF

*Attesting Officer* *Commissioner of Patents and Trademarks*